(No Model.)
A. MARCEAU.
BALL BEARING.
No. 559,902. Patented May 12, 1896.
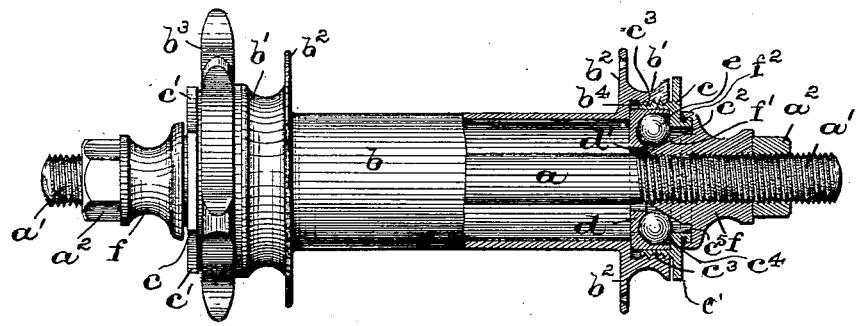
FIG. 1
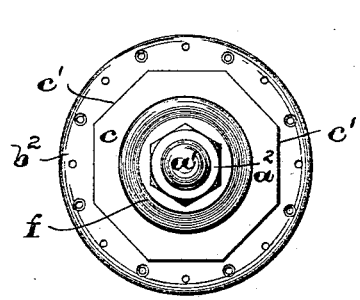
FIG. 2
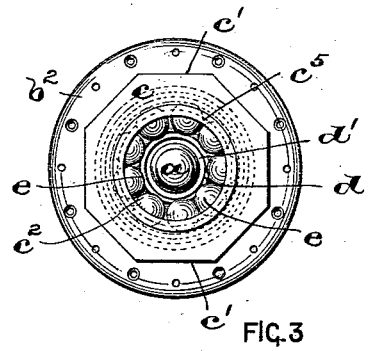
FIG. 3
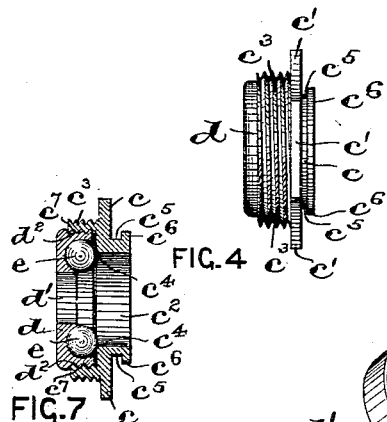
FIG. 4
FIG. 5
FIG. 7
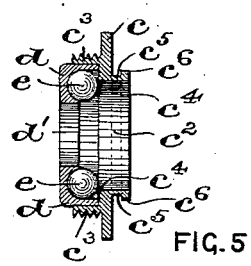
FIG. 6
WITNESSES:
Wm. L. Canfield, Jr.
Marcy J. Trusdell
INVENTOR:
ALFRED MARCEAU.
BY
Fred'k C. Fraentzel,
ATTORNEY
ANDREW B GRAHAM. PHOTO-LITHO. WASHINGTON. D.C.

UNITED STATES PATENT OFFICE.

ALFRED MARCEAU, OF NEWARK, NEW JERSEY.

BALL-BEARING.

SPECIFICATION forming part of Letters Patent No. 559,902, dated May 12, 1896.

Application filed August 24, 1895. Serial No. 560,316. (No model.)

*To all whom it may concern:*

Be it known that I, ALFRED MARCEAU, a citizen of the United States, residing at Newark, in the county of Essex and State of New Jersey, have invented certain new and useful Improvements in Ball-Bearings for Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in ball-bearings for vehicles, such as bicycles, carriages, and the like; and the main object of the invention is to improve the construction of ball-bearings for velocipedes and the like, with a view of providing a simple and effective means for holding the balls in place in taking the journal apart and preventing the spilling and loss of the balls during such operation.

A further object of the invention is to provide a journal ball-bearing having a ball-race cap which is screwed into the seat for the bearing and can be readily removed by means of an ordinary wrench; and still another object of the invention is to provide a ball-race cap with a flange adapted to fit in an annular recess in the cone on the axle, upon which the balls roll, to provide a perfectly dust-proof bearing.

With these ends in view the invention consists in the novel construction of bearing to be hereinafter fully set forth, and also in the novel arrangements and combinations of parts, such as will be hereinafter fully described, and finally embodied in the clauses of the claim.

The invention is clearly illustrated in the accompanying sheets of drawings, in which—

Figure 1 is a view of one form of ball-bearing adapted especially for use in connection with a bicycle-wheel, the same illustrating my novel form of ball-bearing partly in elevation and partly in detail section. Fig. 2 is an end view of the same, and Fig. 3 is a similar view with a nut and the cone on the axle removed. Fig. 4 is a side elevation of the screw-threaded ball-race cap and ball-holder therein. Fig. 5 is a vertical section of the parts illustrated in Fig. 4, showing the arrangement of the balls and the ball-holder in said cap; and Fig. 6 is a perspective view of the ball-holder. Fig. 7 is a view similar to Fig. 5, illustrating the ball holder screwed into the ball-race cap.

Similar letters of reference are employed in said above-described views to indicate like parts.

In said views, $a$ indicates the axle or spindle, and $b$ the tubular hub, provided at its ends with the enlargements $b'$, termed the "seats" for the bearings, and the spoke-flanges $b^2$. When used in connection with the rear wheel of a bicycle, one of said enlargements $b'$ is made considerably longer than the other and has secured thereon in any well-known manner the usual form of sprocket-wheel $b^3$, as clearly illustrated in Fig. 1. Each enlargement $b'$ of the hub $b$ is made in the form of a socket $b^4$, provided with an internal screw-thread into which the ball-race cap $c$ is screwed, as represented in said Fig. 1, thereby forming a seat for each bearing at the ends of the hub. Said caps $c$ are provided with polygonal flanges $c'$, like a nut, for the reception of the jaws of a wrench, and also having the centrally-arranged openings $c^2$. On the back of each cap $c$ is a rearwardly-extending annular flange $c^3$, provided with the external screw-threads, which are of the same pitch as the internal screw-threads in the sockets $b^4$ of the enlargements of the hub, whereby said caps can be readily screwed into their operative positions in said enlargements, as will be clearly evident.

In the space formed by each annular flange $c^3$ of the caps $c$ is slipped and removably held therein by friction a ball-holder $d$, having a centrally-arranged opening $d'$. Said ball-holders $d$, with the shoulders $c^4$, surrounding the central openings $c^2$ in said caps $c$, form raceways for a series of friction-reducing balls $e$, as will be clearly understood from an inspection of Figs. 1, 3, and 5.

The usual forms of screw-threaded cones $f$ are screwed upon the threaded ends $a'$ of the axle or spindle $a$ to bring their cone-surfaces $f'$ in bearing-contact with a small portion of the balls $e$, and the parts are held in their operative relation on the axle $a$ by suitable nuts $a^2$, substantially as illustrated.

From an inspection of the drawings and from the above description of the same it will be seen that when it is desired to remove the bearing for cleaning or repairs the nuts $a^2$ and the cones $f$ and the ball-race caps $c$ are separately and quickly unscrewed by the use of a wrench, with the ball-holder $d$ and its balls $e$ retained in place in the space formed by the annular flange $c^3$ of the cap $c$, thereby avoiding any possibility of spilling and the loss of the balls, the latter being held in place by the cup-shaped ball-holder $d$ and the shoulders $c^4$ on each cap. This is a great advantage over the constructions of ball-bearings as heretofore made, since in this construction when it is desired to remove the balls $e$ to replace them by new ones the holder $d$ is readily and quickly forced from its holding position in the cap $c$ without the use of any tool, which is liable to damage the parts when they are firmly secured in the socketed caps, as heretofore.

As will be seen from Figs. 1, 4, and 5, each cap $c$ may be provided on its face with an annular rib $c^5$, having an annular flange $c^6$, which fits neatly beneath an annular flange $f^2$ on the cones $f$, and thereby provides for a dust-proof guard to the ball-race, as will be evident.

It will be understood that my novel form of ball-bearing is adapted to use in connection with all kinds of axles or journals for bicycles, carriages, or other like vehicles, and is capable of ready application and removal without the least possible danger of losing the balls from their raceway.

Instead of holding the ball-holder $d$ in the annular flange $c^3$ of the cap $c$, as indicated in Fig. 5, by friction, said flange $c^3$ may be provided with an internal screw-thread $c^7$, the holder being provided with a corresponding screw-thread $d^2$, whereby said holder can be screwed fast to the ball-race cap $c$ to hold the balls in their operative positions between the said parts, as will be clearly evident.

I am fully aware that certain changes may be made in the details of the minor arrangements and construction of the several parts comprising my novel form of ball-bearing for vehicles, and hence I do not wish to be understood as limiting my invention to the exact combinations of the parts herein shown and described.

Having thus described my invention, what I claim is—

1. In a ball-bearing for vehicles, the combination, with a cylindrical spindle or axle, and its hub having screw-threaded ends, of ball-supporting elements in each end, consisting essentially, of a ball-race cap, having a rearwardly-extending flange $c^3$ adapted to be screwed into the screw-threaded end of the hub, and having a flange $c^4$ forming a central opening in the face of said cap, and a cup-shaped ball-holder in said cap, removably held therein by friction, and being adapted to be removed from the hub with said ball-race cap, in its operative holding or retaining position in said cap, and balls, substantially as and for the purposes set forth.

2. The combination, with a ball-race cap $c$ having on its face an annular flange or rib $c^5$ and a flange $c^6$, of a cone $f$ having an annular flange $f^2$ into which said flange $c^6$ is fitted, an inwardly-extending and annular flange $c^3$ on said cap, and a cup-shaped ball-holder $d$ removably held in position in said flange $c^3$, and balls, substantially as and for the purposes set forth.

3. In a ball-bearing for vehicles, the combination, with a cylindrical spindle or axle, and its hubs having screw-threaded ends, of ball-supporting elements in each end, comprising therein, a ball-race cap $c$ having a rearwardly-extending flange $c^3$ adapted to be screwed into the screw-threaded end of the hub, a flange $c^4$ forming a central opening $c^2$ in the face of said cap, an annular flange or rib $c^5$ and a flange $c^6$ on the face of said cap, a cone $f$ having an annular flange $f^2$ into which said flange $c^6$ is fitted, and a cup-shaped ball-holder $d$ in said cap, removably held therein by friction, and being adapted to be removed from the hub with the ball-race cap, and balls, substantially as and for the purposes set forth.

In testimony that I claim the invention set forth above I have hereunto set my hand this 20th day of August, 1895.

ALFRED MARCEAU.

Witnesses:
FREDK. C. FRAENTZEL,
FRED W. WOODCOCK.